United States Patent
Akizuki et al.

(10) Patent No.: US 12,224,457 B2
(45) Date of Patent: Feb. 11, 2025

(54) SECONDARY BATTERY

(71) Applicant: MURATA MANUFACTURING CO., LTD., Kyoto (JP)

(72) Inventors: Naoto Akizuki, Kyoto (JP); Masahiro Otsuka, Kyoto (JP); Morimichi Ozaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 651 days.

(21) Appl. No.: 17/506,792

(22) Filed: Oct. 21, 2021

(65) Prior Publication Data

US 2022/0045407 A1    Feb. 10, 2022

Related U.S. Application Data

(63) Continuation of application No. PCT/JP2020/016960, filed on Apr. 17, 2020.

(30) Foreign Application Priority Data

Apr. 25, 2019  (JP) .................. 2019-084574

(51) Int. Cl.
  *H01M 50/533* (2021.01)
  *H01M 4/02* (2006.01)
  (Continued)

(52) U.S. Cl.
  CPC ......... *H01M 50/533* (2021.01); *H01M 4/661* (2013.01); *H01M 10/0525* (2013.01);
  (Continued)

(58) Field of Classification Search
  CPC ....... H01M 2004/026; H01M 2220/30; H01M 50/533; H01M 50/586; H01M 50/543;
  (Continued)

(56) References Cited

U.S. PATENT DOCUMENTS

2003/0228515 A1  12/2003  Woehrle et al.
2017/0047571 A1*  2/2017  Iwasaki .............. H01M 50/103
  (Continued)

FOREIGN PATENT DOCUMENTS

CN    206250261 U   6/2017
CN    108028343     5/2018
  (Continued)

OTHER PUBLICATIONS

Chinese Office Action issued Feb. 29, 2024 in corresponding Chinese Application No. 202080030896.1.
International Search Report for Application No. PCT/JP2020/016960, dated Jul. 14, 2020.
Japanese Office Action issued Oct. 4, 2022 in corresponding Japanese Application No. 2021-516089.

*Primary Examiner* — Brian R Ohara
*Assistant Examiner* — Michelle T Leonard
(74) *Attorney, Agent, or Firm* — K&L Gates LLP

(57) ABSTRACT

Provided is a secondary battery including an electrode assembly and an electrolyte enclosed in an exterior case. The electrode assembly includes a positive electrode, a negative electrode, and a separator disposed between the positive electrode and the negative electrode. The secondary battery includes a spacer positioned between the electrode assembly and an exterior case, and the electrode assembly includes current collecting tabs of a positive electrode and a negative electrode each protruding from the same end face. The spacer is positioned between an end face, of the electrode assembly, from which the current collecting tab protrudes and the exterior case, and at least one of the current collecting tabs of the positive electrode or the negative electrode has a bent shape between the electrode assembly and the spacer.

17 Claims, 10 Drawing Sheets

(51) Int. Cl.
*H01M 4/66* (2006.01)
*H01M 10/0525* (2010.01)
*H01M 10/0587* (2010.01)
*H01M 50/103* (2021.01)
*H01M 50/543* (2021.01)
*H01M 50/586* (2021.01)
*H01M 50/593* (2021.01)

(52) U.S. Cl.
CPC ..... *H01M 10/0587* (2013.01); *H01M 50/103* (2021.01); *H01M 50/543* (2021.01); *H01M 50/586* (2021.01); *H01M 50/593* (2021.01); *H01M 2004/026* (2013.01); *H01M 2220/30* (2013.01)

(58) Field of Classification Search
CPC .. H01M 50/103; H01M 50/593; H01M 4/661; H01M 10/0525; H01M 10/0587
See application file for complete search history.

(56) References Cited

U.S. PATENT DOCUMENTS

| | | |
|---|---|---|
| 2018/0013123 A1 | 1/2018 | Ito |
| 2018/0159108 A1 | 6/2018 | Zheng et al. |
| 2020/0251711 A1 | 8/2020 | Wakimoto et al. |

FOREIGN PATENT DOCUMENTS

| | | |
|---|---|---|
| JP | 2003242957 A | 8/2003 |
| JP | 2004014516 A | 1/2004 |
| JP | 2018006112 A | 1/2018 |
| WO | 2016159099 A1 | 10/2016 |
| WO | 2018155521 A1 | 8/2018 |

\* cited by examiner

SECONDARY BATTERY

CROSS REFERENCE TO RELATED APPLICATIONS

The present application is a continuation of PCT patent application no. PCT/JP2020/016960, filed on Apr. 17, 2020, which claims priority to Japanese patent application no. JP2019-084574 filed on Apr. 25, 2019, the entire contents of which are being incorporated herein by reference.

BACKGROUND

The present disclosure generally relates to a secondary battery.

The secondary battery can be repeatedly charged and discharged because of a so-called storage battery, and is used for various applications. For example, secondary batteries are used in mobile devices such as mobile phones, smartphones, and notebook computers.

The secondary battery generally has a structure in which an electrode assembly is housed in an exterior case. That is, in the secondary battery, the electrode body is housed in the exterior case as the case.

SUMMARY

The present disclosure generally relates to a secondary battery.

The inventors of the present application have noticed that there is a problem to be overcome in the conventional secondary battery, and have found a need to take measures therefor. Specifically, the inventors of the present application have found that there are the following problems.

A secondary battery generally has a structure in which an electrode assembly including a positive electrode, a negative electrode, and a separator disposed therebetween, and an electrolyte are enclosed in an exterior case. The electrode assembly includes current collecting tabs of a positive electrode and a negative electrode each protruding from the same end face of the electrode assembly. In addition, a spacer for insulation between these members is provided between the electrode assembly and the exterior case.

In the exemplary embodiment shown in FIG. 10, the current collecting tab 6 protrudes from the end face 200' of the electrode assembly 200. For insulation between the electrode assembly 200 and the exterior case 300, a spacer 4 is provided close to the end face 200'. The spacer 4 is provided with an opening 8 through which the current collecting tab 6 passes. The current collecting tab 6 crosses the opening 8 of the spacer 4 and is positioned between the spacer 4 and the exterior case 300.

In the secondary battery having such a configuration, when an impact or heat is applied, the electrode assembly 200 may collide with the spacer 4 and cause a short circuit.

The present disclosure has been made in view of such problems. That is, a main object of the present disclosure is to provide a secondary battery more suitable from the viewpoint of preventing a short circuit.

According to an embodiment of the present disclosure, a secondary is provided. The secondary battery includes an electrode assembly and an electrolyte enclosed in an exterior case. The electrode assembly includes a positive electrode, a negative electrode, and a separator disposed between the positive electrode and the negative electrode. The secondary battery includes a spacer positioned between the electrode assembly and the exterior case. The electrode assembly includes current collecting tabs of a positive electrode and a negative electrode each protruding from a same end face of the electrode assembly. The spacer is positioned between an end face, of the electrode assembly, from which the current collecting tabs each protrude and an exterior case. At least one of the current collecting tabs of the positive electrode or the negative electrode has a bent shape between the electrode assembly and the spacer.

The secondary battery according to the present disclosure has a more suitable structure from the viewpoint of preventing a short circuit.

Specifically, in the secondary battery according to the present disclosure, at least one of the current collecting tabs of the positive electrode and the negative electrode has a bent shape between the electrode assembly and the spacer. In other words, the current collecting tab having a bent shape is positioned in the space between the electrode assembly and the spacer. Accordingly, when heat and/or impact is applied to the secondary battery, the current collecting tab functions as a cushioning material, and collision of the electrode assembly and the spacer can be prevented. Therefore, a short circuit in the electrode assembly can be more suitably prevented.

DETAILED DESCRIPTION

Figure 1A:
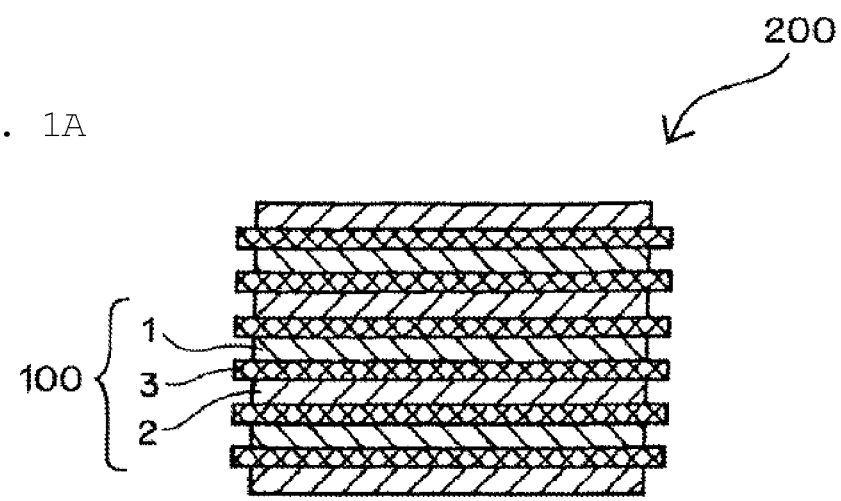
FIGS. 1A and 1B are schematic sectional views (FIG. 1A: non-wound planar lamination type battery, FIG. 1B: wound battery) of an electrode assembly according to an embodiment of the present disclosure.

Hereinafter, a secondary battery according to an embodiment of the present disclosure will be described in more detail. Although the description will be made with reference to the drawings as necessary, various elements in the drawings are merely schematically and exemplarily illustrated for understanding of the present disclosure, and appearance, dimensional ratios, and the like may be different from actual ones.

The direction of the "thickness" described directly or indirectly in the present specification is based on the lamination direction of the electrode materials constituting the secondary battery. For example, in the case of a "secondary battery having a thickness in a plate shape" such as a flat battery, the direction of the "thickness" corresponds to the plate thickness direction of the secondary battery.

In the present specification, the term "sectional view" is based on a virtual section of an object obtained by cutting along the thickness direction of the secondary battery. For example, it is based on a section cut along a face constituted by a thickness direction based on a lamination direction of electrode layers constituting the secondary battery and a longitudinal direction in which the electrode layers extend in a direction in which the electrode terminals are located. In short, it is based on the form of the section of the secondary battery shown in FIG. 4 and the like.

The present disclosure provides a secondary battery. In the present specification, the term "secondary battery" refers to a battery that can be repeatedly charged and discharged. The "Secondary battery" is not excessively restricted to its name, and may include, for example, an electrochemical device such as an "electrical storage device".

Figure 1B:
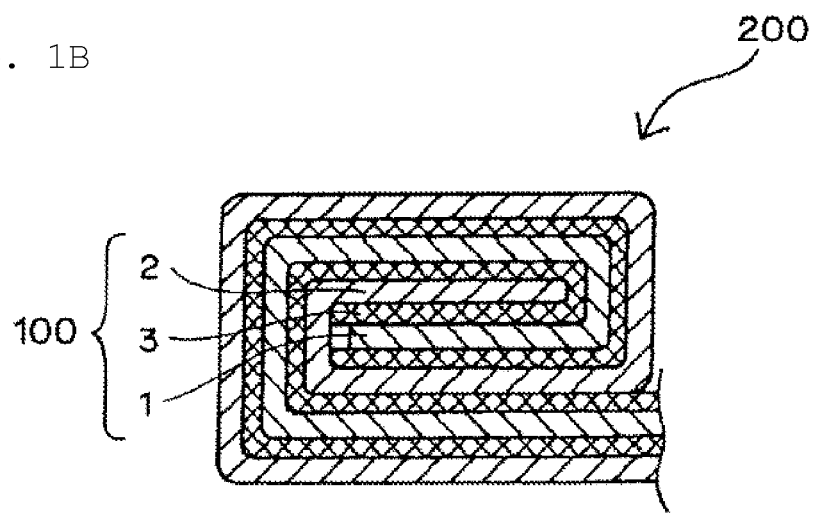

A secondary battery according to the present disclosure includes an electrode assembly having an electrode constituent unit including a positive electrode, a negative electrode, and a separator. FIGS. 1A and 1B illustrate the electrode assembly 200. As illustrated, a positive electrode 1 and a negative electrode 2 are laminated with a separator 3 interposed therebetween to form an electrode constituent unit 100. The electrode assembly is configured by laminating at least one or more of such electrode constituent units (see FIG. 1A), or the electrode assembly is configured by winding the electrode constituent unit (see FIG. 1B). In the secondary battery, such an electrode assembly together with an electrolyte (for example, a nonaqueous electrolyte) is enclosed in an exterior case.

The positive electrode includes at least a positive electrode material layer and a positive electrode current collector (for example, a positive electrode current collector in a layer form). In the positive electrode, a positive electrode material layer is provided on at least one face of the positive electrode current collector, and the positive electrode material layer contains a positive electrode active substance as an electrode active substance. For example, in each of the plurality of positive electrodes in the electrode assembly, the positive electrode material layer may be provided on both faces of the positive electrode current collector, or the positive electrode material layer may be provided only on one face of the positive electrode current collector. From the viewpoint of further increasing the capacitance of the secondary battery, the positive electrode preferably includes the positive electrode material layer on both faces of the positive electrode current collector.

The negative electrode includes at least a negative electrode material layer and a negative electrode current collector (for example, a negative electrode current collector in a layer form). In the negative electrode, a negative electrode material layer is provided on at least one face of a negative electrode current collector, and the negative electrode material layer contains a negative electrode active substance as an electrode active substance. For example, in each of the plurality of negative electrodes in the electrode assembly, the negative electrode material layer may be provided on both faces of the negative electrode current collector, or the negative electrode material layer may be provided only on one face of the negative electrode current collector. From the viewpoint of further increasing the capacitance of the secondary battery, the negative electrode preferably includes the negative electrode material layer on both faces of the negative electrode current collector.

The electrode active substances contained in the positive electrode and the negative electrode, that is, the positive electrode active substance and the negative electrode active substance are substances directly involved in electron transfer in the secondary battery, and are main substances of positive and negative electrodes responsible for charge and discharge, that is, the cell reaction. More specifically, ions are generated in the electrolyte due to "the positive electrode active substance contained in the positive electrode material layer" and "the negative electrode active substance contained in the negative electrode material layer", and such ions are transferred between the positive electrode and the negative electrode to transfer electrons, resulting in charging and discharging. It is preferable that the positive electrode material layer and the negative electrode material layer be layers capable of absorbing and releasing lithium ions, in particular. That is, the battery is preferably a nonaqueous electrolyte secondary battery in which lithium ions move between the positive electrode and the negative electrode with the nonaqueous electrolyte interposed therebetween to charge and discharge the battery. When lithium ions are involved in charging and discharging, the secondary battery according to the present disclosure corresponds to a so-called lithium ion battery, and the positive electrode and the negative electrode have a layer capable of absorbing and releasing lithium ions.

The positive electrode active substance of the positive electrode material layer, which comprises, for example, a granular material, preferably includes a binder in the positive electrode material layer for more sufficient contact between grains and shape retention. Furthermore, a conductive auxiliary agent may be contained in the positive electrode material layer in order to facilitate transmission of electrons for promoting the cell reaction. Similarly, the negative electrode active substance of the negative electrode material layer, which comprises, for example, a granular material, preferably includes a binder for sufficient contact between grains and shape retention, and a conductive auxiliary agent for smooth transfer of electrons promoting a cell reaction may be included in the negative electrode material layer. As described above, since the plurality of components is contained, the positive electrode material layer and the negative electrode material layer can also be referred to as "positive electrode mixture material layer" and "negative electrode mixture material layer", respectively.

It is preferable that the positive electrode active substance be a substance contributing to absorbing and releasing of lithium ions. In this respect, it is preferable that the positive electrode active substance be, for example, a lithium-containing composite oxide. More specifically, the positive electrode active substance may be a lithium transition metal composite oxide containing lithium and at least one transition metal selected from the group consisting of cobalt, nickel, manganese, and iron. That is, in the positive electrode material layer of the secondary battery according to the embodiment, such a lithium transition metal composite oxide is preferably included as a positive electrode active substance. For example, the positive electrode active substance is lithium cobalt oxide, lithium nickel oxide, lithium manganate, lithium iron phosphate, or a material in which some of their transition metals are replaced with another metal. Although such a positive electrode active substance may be included as a single material, two or more materials may be contained in combination.

The binder that can be contained in the positive electrode material layer is not particularly limited, but examples thereof may include at least one selected from the group consisting of polyvinylidene fluoride, vinylidene fluoride-hexafluoropropylene copolymer, vinylidene fluoride-tetrafluoroethylene copolymer, polytetrafluoroethylene and the like. The conductive auxiliary agent which can be contained in the positive electrode material layer is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative and the like. In an exemplary embodiment, the binder of the positive electrode material layer is polyvinylidene fluoride, and in another exemplary embodiment, the conductive auxiliary agent of the positive electrode material layer is carbon black. In a further exemplary embodiment, the binder and the conductive auxiliary agent of the positive electrode material layer are a combination of polyvinylidene fluoride and carbon black.

The thickness dimension of the positive electrode material layer is not particularly limited, but is preferably 1 µm or more and 300 µm or less, for example, 5 µm or more and 200 µm or less. The thickness dimension of the positive electrode material layer is the thickness inside the secondary battery, and an average value of measured values at any 10 points is used.

The negative electrode active substance is preferably a substance that contributes to absorbing and releasing of lithium ions. In this respect, it is preferable that the negative electrode active substance be, for example, various carbon materials, oxides or lithium alloys.

Examples of various carbon materials of the negative electrode active substance include graphite (for example, natural graphite and/or artificial graphite), hard carbon, soft carbon, and/or diamond-like carbon. Specifically, graphite is preferable because it has high electron conductivity and excellent adhesion to a negative electrode current collector and the like. Examples of the oxide of the negative electrode active substance may include at least one selected from the group consisting of silicon oxide, tin oxide, indium oxide, zinc oxide, lithium oxide and the like. The lithium alloy of the negative electrode active substance may be any metal that can be alloyed with lithium and examples thereof may include a binary, ternary or higher alloy of a metal such as Al, Si, Pb, Sn, In, Bi, Ag, Ba, Ca, Hg, Pd, Pt, Te, Zn, and La, and lithium. Such an oxide may be amorphous as its structural form. This is because degradation due to nonuniformity such as grain boundaries or defects hardly occurs. In an exemplary embodiment, the negative electrode active substance of the negative electrode material layer is artificial graphite.

The binder that can be contained in the negative electrode material layer is not particularly limited, but examples thereof may include at least one selected from the group consisting of styrene butadiene rubber, polyacrylic acid, polyvinylidene fluoride, polyimide-based resin and polyamideimide-based resin. In a more preferred embodiment, the binder contained in the negative electrode material layer is styrene butadiene rubber. The conductive auxiliary agent which can be contained in the negative electrode material layer is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative and the like. The negative electrode material layer may contain a component attributable to the thickener component (for example, carboxymethyl cellulose) used at the time of manufacturing the battery.

In an exemplary embodiment, the negative electrode active substance and the binder in the negative electrode material layer are a combination of artificial graphite and styrene butadiene rubber.

The thickness dimension of the negative electrode material layer is not particularly limited, but is preferably 1 µm or more and 300 µm or less, for example, 5 µm or more and 200 µm or less. The thickness dimension of the negative electrode material layer is the thickness inside the secondary battery, and an average value of measured values at any 10 points is used.

The positive electrode current collector and the negative electrode current collector used for the positive electrode and the negative electrode are members that contribute to the collection and supply of electrons generated in the active substance due to the cell reaction. Such a current collector may be a sheet-like metal member and may have a porous or perforated form. For example, the current collector is a metal foil, a punching metal, a net, an expanded metal or the like. The positive electrode current collector used for the positive electrode preferably comprises a metal foil containing at least one selected from the group consisting of aluminum, stainless steel, nickel and the like, and may be, for example, an aluminum foil. On the other hand, the negative electrode current collector used for the negative electrode preferably comprises a metal foil containing at least one selected from the group consisting of copper, stainless steel, nickel and the like, and may be, for example, a copper foil.

The separator is a member provided from the viewpoint of prevention of short circuit by contact of the positive and negative electrodes, retention of the electrolyte and the like. In other words, it can be said that the separator is a member that passes ions while preventing electronic contact between the positive electrode and the negative electrode. Preferably, the separator is a porous or microporous insulating member and has a film form due to its small thickness. Although it is merely an example, a microporous membrane made of polyolefin may be used as a separator. In this regard, the microporous membrane used as a separator may be, for example, a polyolefin containing only polyethylene (PE) or polypropylene (PP). Furthermore, the separator may be a laminate composed of a "microporous membrane made of PE" and a "microporous membrane made of PP". The surface of the separator may be covered with an inorganic grain coat layer and/or an adhesive layer or the like. The surface of the separator may have adhesion.

The thickness dimension of the separator is not particularly limited, but is preferably 1 µm or more and 100 µm or less, for example, 5 µm or more and 20 µm or less. The thickness dimension of the separator is the thickness inside the secondary battery (particularly, the thickness between the positive electrode and the negative electrode), and an average value of measured values at any 10 points is used.

The thickness dimension of the separator is the thickness inside the secondary battery (particularly, the thickness between the positive electrode and the negative electrode), and an average value of measured values at any 10 points may be used. The electrolyte assists the movement of the metal ions released from the electrodes (positive electrode/negative electrode). The electrolyte may be a "nonaqueous" electrolyte such as an organic electrolyte and an organic solvent, or may be an "aqueous" electrolyte containing water. In an exemplary embodiment, the secondary battery according to the present disclosure is a nonaqueous electrolyte secondary battery using an electrolyte containing a "nonaqueous" solvent and a solute as an electrolyte.

It is preferable to include at least carbonate as a specific solvent for the nonaqueous electrolyte. Such carbonate may be cyclic carbonates and/or chain carbonates. Although not particularly limited, examples of the cyclic carbonates may include at least one selected from the group consisting of propylene carbonate (PC), ethylene carbonate (EC), butylene carbonate (BC) and vinylene carbonate (VC). Examples of the chain carbonates may include at least one selected from the group consisting of dimethyl carbonate (DMC), diethyl carbonate (DEC), ethyl methyl carbonate (EMC) and dipropyl carbonate (DPC). In one exemplary embodiment of the present disclosure, a combination of cyclic carbonates and chain carbonates is used as the nonaqueous electrolyte, and, for example, a mixture of ethylene carbonate and diethyl carbonate is used. As a specific nonaqueous electrolyte solute, for example, Li salts such as LiPF6 and LiBF4 are preferably used.

As the current collecting tab, any current collecting tab used in the field of secondary battery can be used. The current collecting tab may be composed of a material for which electron transfer can be achieved, and is usually composed of a conductive material such as silver, gold, copper, iron, tin, platinum, aluminum, nickel, and/or stainless steel. The form of the current collecting tab is not particularly limited, and may be, for example, a linear shape or a plate shape. The current collecting tabs of the positive electrode and the negative electrode (hereinafter also collectively referred to as "current collecting tabs of positive and negative electrodes") may protrude from any face of the electrode assembly. The current collecting tabs of the positive and negative electrodes may protrude from different faces of the electrode assembly, or may protrude from the same face. From the viewpoint of making the secondary battery compact, it is preferable that the current collecting tabs of the positive and negative electrodes protrude from the same face. That is, the positive electrode current collecting tab and the negative electrode current collecting tab may extend so as to protrude from the same end face (that is, the same side face) of the electrode assembly.

The exterior case is usually a hard case, and may be composed of two members such as a main body and a lid. For example, in a case where the exterior case includes a main body and a lid, the main body and the lid are sealed after the electrode assembly, the electrolyte, the current collecting tab, the electrode terminal as desired, and the like are housed. The method of sealing the exterior case is not particularly limited, and examples thereof include a laser irradiation method.

Any material that can constitute a hard case exterior case in the field of secondary batteries can be used as the material constituting the main body and the lid of the exterior case. Such a material may be a conductive material for which electron transfer may be achieved or an insulating material for which electron transfer may not be achieved. The material of the exterior case is preferably a conductive material from the viewpoint of taking out the electrode.

Examples of the conductive material include conductive materials such as silver, gold, copper, iron, tin, platinum, aluminum, nickel, and/or stainless steel. Examples of the insulating material include insulating polymer materials such as polyester (for example, polyethylene terephthalate), polyimide, polyamide, polyamideimide, and/or polyolefin (for example, polyethylene and/or polypropylene).

From the viewpoint of the above-described conductivity and rigidity, both the main body and the lid may be made of stainless steel. As defined in "JIS G0203 Glossary of terms used in iron and steel", stainless steel is chromium or alloy steel containing chromium or chromium and nickel, and generally refers to steel having a chromium content of about 10.5% or more of the whole. Examples of such stainless steel include martensitic stainless steel, ferritic stainless steel, austenitic stainless steel, austenitic ferritic stainless steel and/or precipitation hardening stainless steel.

The dimensions of the main body and the lid of the exterior case are mainly determined according to the dimensions of the electrode assembly. For example, it is preferable that the exterior case has such a dimension that movement of the electrode assembly in the exterior case is prevented when the electrode assembly is housed. By preventing the movement of the electrode assembly, damage to the electrode assembly due to impact or the like can be prevented, and the safety of the secondary battery can be improved.

The exterior case may be a flexible case such as a pouch made of a laminated film. Examples of the laminated film may have a configuration in which at least a metal layer (for example, aluminum or the like) and an adhesive layer (for example, polypropylene and/or polyethylene, etc.) are laminated, and a configuration in which a protective layer (for example, nylon and/or polyamide, etc.) is additionally laminated.

The thickness dimension (that is, the thickness dimension) of the exterior case is not particularly limited, but is preferably 10 μm or more and 200 μm or less, for example, 50 μm or more and 100 μm or less. As the thickness dimension of the exterior case, an average value of measured values at any 10 points is used.

The secondary battery is generally provided with an electrode terminal. Such an electrode terminal may be provided on at least one face of the exterior case. For example, the electrode terminal of the positive electrode and the electrode terminal of the negative electrode may be provided away from each other on the same face of the exterior case. Alternatively, the electrode terminal of the positive electrode and the electrode terminal of the negative electrode may be provided on different faces of the exterior case. From the viewpoint of making the secondary battery compact, the electrode terminal of the positive electrode and the electrode terminal of the negative electrode may protrude from the same face. Specifically, the electrode terminals of the positive electrode and the negative electrode may protrude from the side face of the exterior case so as to protrude in a direction perpendicular to the direction in which the electrode layers are laminated.

The electrode terminal preferably comprises a material having high conductivity. The material of the electrode terminal is not particularly limited, but may be at least one selected from the group consisting of silver, gold, copper, iron, tin, platinum, aluminum, nickel, and stainless steel.

The electrode terminal may be composed of a single material or may be composed of a plurality of materials. An electrode terminal (hereinafter, also referred to as an "electrode terminal structure") composed of a plurality of materials includes a rivet portion, an inner terminal, and a gasket portion.

The rivet portion and the inner terminal may be composed of a material capable of achieving movement of electrons. For example, the rivet portion and the inner terminal are each composed of a conductive material such as silver, gold, copper, iron, tin, platinum, aluminum, nickel, and/or stainless steel. The gasket portion may be composed of an insulating material. For example, the gasket portion is composed of an insulating polymer material such as polyester (for example, polyethylene terephthalate), polyimide, polyamide, polyamideimide, and/or polyolefin (for example, polyethylene and/or polypropylene).

Each of the current collecting tabs of the positive and negative electrodes is electrically connected to the electrode terminal or the electrode terminal structure, and is electrically led out to the outside with the electrode terminal or the electrode terminal structure interposed therebetween.

Although the electrode terminal structure is not particularly limited, for example, the electrode terminal structure may be fitted and inserted into the through hole of the exterior case. The electrode terminal structure may include a conductive rivet portion for mainly leading the electrode to the outside, an outer gasket portion for preventing leakage of the electrolyte while ensuring electrical insulation between the rivet portion and the exterior case, an inner terminal for ensuring electrical connection between the rivet portion and the current collecting tab, and an inner gasket portion for preventing leakage of the electrolyte while ensuring electrical insulation between the inner terminal and the exterior case.

The current collecting tabs of the positive and negative electrodes may be connected to an electrode terminal or an electrode terminal structure. In addition, the current collecting tabs of the positive and negative electrodes may be electrically connected to the exterior case and electrically led out to the outside with the exterior case interposed therebetween. For example, when the exterior case is a conductive hard case type exterior case, the current collecting tab may be in contact with and electrically connected to the inside of the exterior case, and may be led out to the outside with the exterior case interposed therebetween. In other words, the exterior case may be connected to the current collecting tab to assume a charge of the positive electrode or the negative electrode, and the current collecting tab may be electrically led out to the outside from the electrode terminal provided on the exterior case.

From the viewpoint of compactness and voltage balancing of the secondary battery, it is preferable that the current collecting tab of one of the positive and negative electrodes is electrically connected to the electrode terminal structure, and the current collecting tab of the other of the positive and negative electrodes is electrically connected to the inside of the conductive hard case type exterior case.

Any spacer used in the field of secondary battery can be used as the spacer. The spacer is not particularly limited as long as it prevents, for example, electronic contact between the electrode assembly (particularly the electrode) and the exterior case (particularly the electrode terminal). Therefore, the spacer can also be referred to as an insulating member that prevents electronic contact between the electrode assembly and the exterior case (particularly, the electrode terminal thereof). The spacer may have, for example, a plate shape as a whole. Examples of the material constituting the spacer include polymer materials such as polyolefin (for example, polyethylene and/or polypropylene, etc.), polystyrene, polyester (for example, polyethylene terephthalate and/or polybutylene terephthalate), polyvinyl chloride, acrylic polymer (for example, polymethyl methacrylate or the like) and/or polycarbonate, and various insulating materials such as rubber materials such as nitrile rubber, urethane rubber, fluororubber and/or silicone rubber. The spacer may have any form as long as contact between the electrode assembly and the exterior case can be prevented. For example, the spacer may have a form of a film, a sheet, a board, or a fabric (for example, a nonwoven fabric).

A secondary battery according to the present disclosure is a battery including an electrode assembly and an exterior case housing the electrode assembly, and is characterized in terms of a form of a current collecting tab protruding from the electrode assembly and a positional relationship between members around the current collecting tab.

Specifically, in the secondary battery according to the present disclosure, at least one of the current collecting tabs of the positive and the negative electrodes has a bent shape between the electrode assembly and the spacer. That is, the electrode assembly and the spacer are away from each other, and at least one of the current collecting tabs has a bent shape in the separation space. It can also be said that at least one of the current collecting tabs of the positive and negative electrodes extends in a bent shape in a local space formed between the electrode assembly and the spacer. In the illustrated exemplary embodiment, the secondary battery includes the spacer 4 positioned between the electrode assembly 200 and the exterior case 300 inside the exterior case 300 (310) (see FIG. 2). The spacer 4 is, for example, a plate-like spacer, and such a spacer 4 is provided so as to partition a space between one side face (Specifically, an "end face" described below) of the electrode assembly 200 and the exterior case 300. The main face of the spacer 4 may have a size that can substantially cover one side face of the electrode assembly 200. For example, as can be seen from FIG. 2, the main face of the plate-shaped spacer 4 may have substantially the same size as the size of the end face of one side face of the electrode assembly 200 as a whole.

Such a spacer is provided for the end face 200' including an outwardly protruding current collecting tab. More specifically, the secondary battery includes the spacer 4 positioned between the end face 200', of the electrode assembly 200, from which the current collecting tab protrudes and the exterior case 300 (see FIG. 4). The end face 200' of the electrode assembly 200 and the spacer 4 are away from each other. As can be seen from the illustrated aspect, the spacer 4 is provided in non-contact with or away from the separator extension portion extending outside the positive electrode and the negative electrode. Here, the current collecting tab 6 (that is, the positive electrode current collecting tab 61 and/or the negative electrode current collecting tab 62) having a bent shape is positioned between the electrode assembly 200 and the spacer 4 (see FIGS. 4 and 5). That is, in sectional view, the current collecting tab 6 extends so as to meander due to the bent shape in the separation space between the electrode assembly and the spacer. When the current collecting tab 6 has the bent shape between the electrode assembly 200 and the spacer 4 as described above, the current collecting tab 6 functions as a cushioning material (for example, like a spring) when a fluctuation in impact or heat occurs in the secondary battery 400, and it is possible to prevent the collision between the electrode assembly 200 and the spacer 4. More simply, the current collecting tab 6 can absorb an impact that may occur, for example, between the electrode assembly 200 and the spacer 4. Therefore, a short circuit in the electrode assembly 200 can be more suitably prevented.

In a broad sense, the "bent shape" in the present disclosure refers to a form of a current collecting tab that greatly bends so as to form a convex shape in sectional view. In a narrow sense, the "bent shape" refers to a form in which a current collecting tab protruding from the electrode assembly is bent and extended so as to be folded back in sectional view. In the exemplary embodiment shown in FIG. 4, when viewed from $K_3$ as a starting point, the current collecting tab 6 goes to a spacer 4 from the electrode assembly 200, and then is bent toward the electrode assembly 200 from the spacer 4 with the portion $K_1$ having the bent shape as a boundary. In the exemplary embodiment shown in FIG. 4, the current collecting tab 6 has a portion $K_2$ having a bent shape bent from the electrode assembly 200 toward the spacer 4. As can be seen from such an exemplary embodiment, the current collecting tab protruding from the electrode assembly extends so as to meander in the separation space between the electrode assembly and the spacer.

The "bent shape" in the present disclosure can include a bent shape represented by a bowed shape and/or a folded shape. As indicated by $K_1$ and $K_2$ in FIG. 4, the term "bowed shape" means bending in a baylike (or arch) shape (that is, bending in a substantially curved manner) in sectional view, which results in rounded bending and also includes flexure. The "folded shape" means bending with an acute angle (that is, bending substantially linearly) in sectional view. From the viewpoint of improving impact absorbability, the "bent shape" preferably has a bowed shape. That is, the bent shape of the current collecting tab may be a bowed shape bent in an arch shape, so that the current collecting tab can more suitably absorb an impact that may occur between the electrode assembly and the spacer. In the exemplary embodiment illustrated in FIG. 4, the bent shapes of the portions $K_1$ and $K_2$ each having the bent shape are bowed.

As can be seen from the illustrated aspect, the "bent shape" in the present disclosure can also be referred to as a "folded shape", a "substantially U-shaped (or substantially V-shaped) shape", a "curved shape having a maximum point", a "shape bent with an acute angle", or the like.

The current collecting tab 6 may have at least one bent shape in the gap between the electrode assembly 200 and the spacer 4. Preferably, the current collecting tabs 6 has a plurality of (for example, two) bent shapes (see FIGS. 4 and 5). Since the current collecting tab 6 has a plurality of bent shapes, the elasticity (for example, spring elasticity) of the current collecting tab 6 can be further improved, and an impact that can be generated between the electrode assembly 200 and the spacer 4 can be further absorbed. From the viewpoint of making the secondary battery compact, the number of bent shapes of the current collecting tabs 6 is preferably 5 or less (that is, the positive electrode current collecting tab or the negative electrode current collecting tab preferably has 2 or more and 5 or less bent portions in a gap space between the electrode assembly 200 and the spacer 4).

Figure 6:
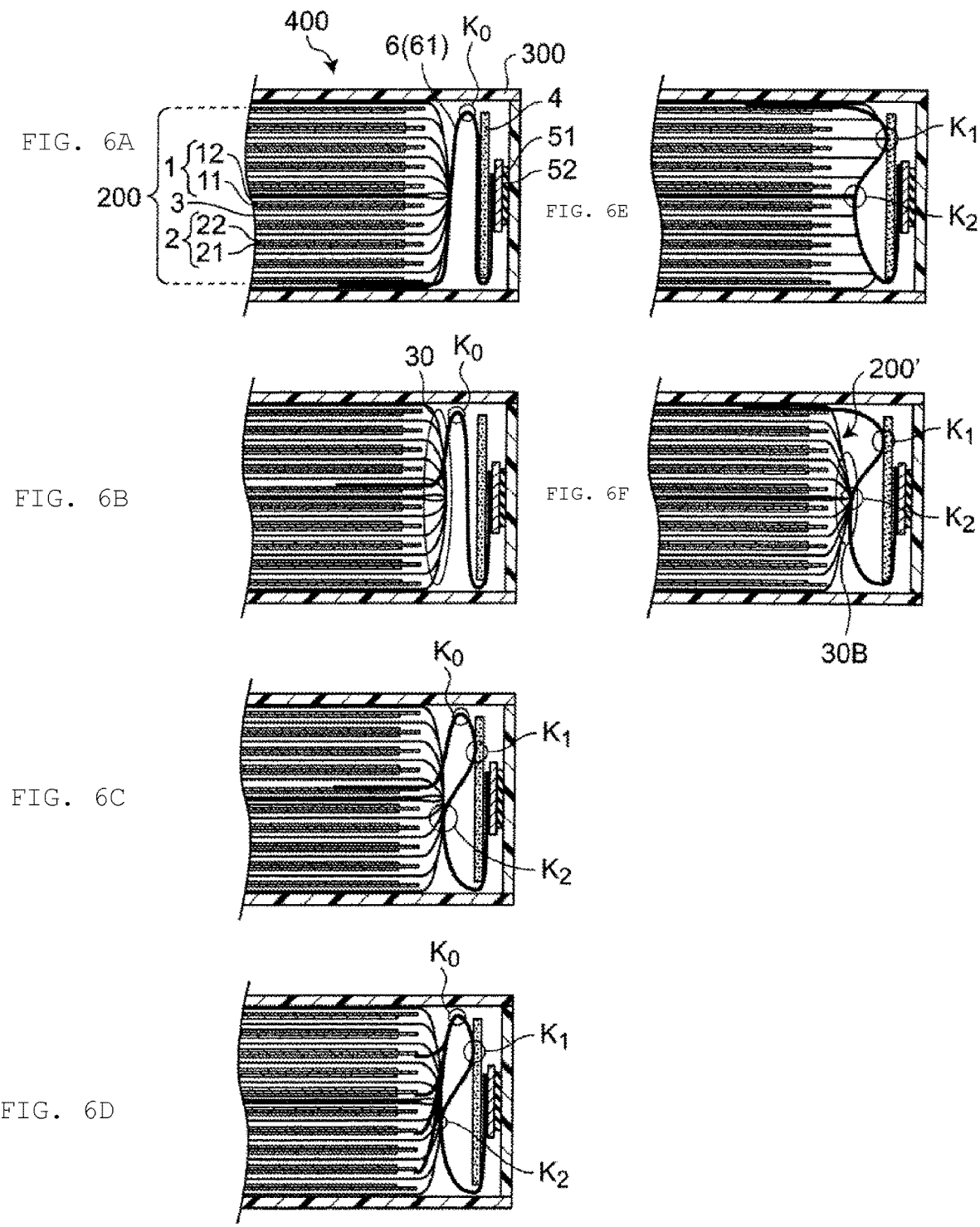
FIGS. 6A to 6F are schematic diagrams of various aspects of a current collecting tab according to an embodiment of the present disclosure.

For example, in sectional view of the secondary battery 400, the current collecting tab 6 may have a portion $K_0$ having a bent shape so as to form a convex shape in the thickness direction (see FIG. 6A). In addition, the current collecting tab 6 may protrude from the electrode at the outermost layer of the electrode assembly 200 (see FIG. 6A). For example, the current collecting tab 6 may protrude outward from the outermost layer of the electrode assembly 200 in a direction orthogonal to the lamination direction of the assembly. Furthermore, it may protrude from the electrode at the inner layer of the electrode assembly 200 (see FIG. 6B). That is, the current collecting tab 6 may protrude outward from the electrode at the non-outermost layer that is not the outermost layer in the electrode assembly 200. When the current collecting tab 6 protrudes from the electrode at the inner layer of the electrode assembly 200, the current collecting tab 6 may have three portions (that is, $K_0$, $K_1$, and $K_2$) each having the bent shape (see FIG. 6C). The electrode assembly 200 may be a planar lamination type electrode assembly, and in this case, the sub current collecting tab protruding from each electrode may be bound to form the current collecting tab 6 (see FIG. 6D). When such a planar lamination type electrode assembly 200 is used (see FIG. 1A), the current collecting tab 6 may be provided separately from the tab electrically connecting the electrodes in each of the positive electrode and the negative electrode.

At least one of the current collecting tabs of the positive and negative electrodes may have a bent shape between the electrode assembly and the spacer, and it is preferable that both the current collecting tabs of the positive and negative electrodes each have a bent shape. Since both the current collecting tabs of the positive and negative electrodes each have a bent shape, both the current collecting tabs can have elasticity. In addition, it is possible to form an impact absorbing region at different positions between the electrode assembly and the spacer. As a result, it is possible to further absorb an impact that may occur between the electrode assembly and the spacer. Furthermore, when an impact or heat is applied to the secondary battery, it is possible to more suitably prevent the electrode assembly and the spacer from moving (particularly, the electrode assembly rotates in the circumferential direction in plan view in the exterior case).

Figure 4:
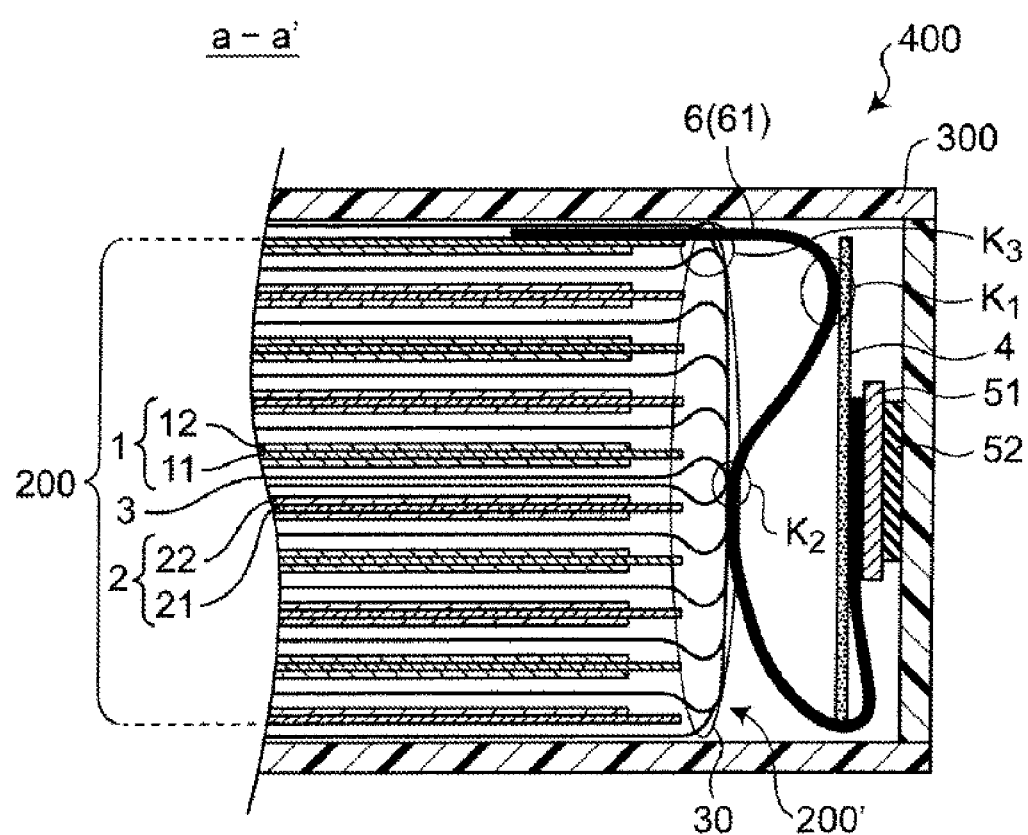
FIG. 4 is a schematic sectional view of the secondary battery taken along line a-a' in FIG. 3.

In the illustrated exemplary embodiment, the positive electrode current collecting tab 61 has a bent shape between the electrode assembly 200 and the spacer 4 (see FIG. 4). In addition, the negative electrode current collecting tab 62 has a bent shape between the electrode assembly 200 and the spacer 4 (see FIG. 5). That is, both the positive electrode current collecting tab 61 and the negative electrode current collecting tab 62 each have a bent shape in the "separation space" in which the same spacer is involved. As a result, it is possible to more effectively absorb an impact or the like that may occur between the electrode assembly 200 and the spacer 4 while taking into account the compactness of the secondary battery.

In an embodiment, the portion having the bent shape of the current collecting tab is in contact with the spacer. That is, the convex portion of the current collecting tab is in contact with the main face of the spacer in sectional view. Since the portion having the bent shape of the current collecting tab is in contact with the spacer, it is easy to more effectively absorb an impact or the like that may occur between the electrode assembly 200 and the spacer 4. In the exemplary embodiment shown in FIG. 4, the current collecting tab 6 has the portion $K_1$ having the bent shape. Here, the portion $K_1$ having the bent shape is in contact with the spacer 4.

In the secondary battery of the present disclosure, the current collecting tab may be in contact with the spacer and may also be in contact with the separator between the electrode assembly and the spacer. That is, for example, as illustrated in FIG. 4, the current collecting tab protruding laterally from the electrode assembly is in contact with both the spacer and the separator while meandering due to the bent shape. This makes it easy to absorb an impact or the like that may occur between the electrode assembly 200 and the spacer 4 while taking into consideration the compactness of the secondary battery. In a preferred aspect, at least two portions each having the bent shape of the current collecting tab are provided, one bent portion of the current collecting tab is in contact with the spacer, and the other bent portion of the current collecting tab is in contact with the separator.

That is, each or any one of the positive electrode current collecting tab and the negative electrode current collecting tab extends so as to meander due to the bent shape, and one of at least two bent portions forming the meander is in contact with the spacer and the other is in contact with the separator. Since the current collecting tabs are in contact with the spacer and the separator by the independent bent portions in this manner, it is possible to more effectively absorb an impact or the like which may be generated between the electrode assembly and the spacer while making the secondary battery compact.

In an embodiment, the electrode assembly has a separator extension portion in which the separator extends to the outside of the positive electrode and the negative electrode at the end face from which the current collecting tab protrudes, and the portion having the bent shape of the current collecting tab is in contact with the separator extension portion. The separator extension portion extends outside the positive electrode layer and the negative electrode layer particularly in a direction orthogonal to the lamination direction of the electrode assembly. It can be said that a portion where the separator extends beyond the end portions of the electrode layers of the positive electrode layer and the negative electrode layer corresponds to the separator extension portion. In the exemplary embodiment shown in FIG. 4, the electrode assembly 200 has a separator extension portion 30 in which the separator 3 extends so as to protrude from the positive electrode 1 and the negative electrode 2 at the end face 200' from which the current collecting tab 6 protrudes. Here, the portion $K_2$ having the bent shape of the current collecting tab 6 is in contact with the separator extension portion 30. As shown in FIG. 4, the folded portion of portions each having the bent shape may be in contact with the separator extension portion 30.

With the above-described configuration, the portion $K_1$ and/or $K_2$ each having a bent shape serves as a fulcrum, and the elasticity of the current collecting tab 6 can be improved. With such a configuration, it is possible to further absorb an impact which may be generated between the electrode assembly 200 and the spacer 4. The separator extension portion 30 may have a structure in which the plurality of separators 3 converges with each other (see FIGS. 4, 5 and 6A to D). Alternatively, the separator extension portion 30 may not have such converging (see FIG. 6E), and the end of the separator extension portion 30 may be in contact with the bent portion of the current collecting tab. In the aspect shown in FIG. 6E, the current collecting tab protruding from the electrode assembly extends so as to meander in the separation space between the electrode assembly (particularly, the electrode assembly without the separator) and the spacer.

In a more preferred embodiment, the portions $K_1$ and $K_2$ each having the bent shape of the current collecting tab 6 are in contact with the spacer 4 and the separator extension portion 30, respectively (see FIG. 4 and the like). With such a configuration, each fulcrum can be formed such that the current collecting tab 6 is interposed between the electrode assembly 200 and the spacer 4. Thereby, the elasticity of the current collecting tab 6 can be particularly improved, and an impact that can be generated between the electrode assembly 200 and the spacer 4 can be further absorbed.

The spacer may have an opening or a recess for the current collecting tab. Accordingly, the current collecting tab 6 can be extended from one side (that is, the electrode assembly 200 side) to the other side (that is, the exterior case 300 side) of the spacer 4 (see FIG. 4). That is, the current collecting tab 6 can extend so as to straddle the spacer 4 with such an opening or a recess interposed therebetween. As shown in sectional view of FIG. 4, the current collecting tab may extend in a meandering manner while being in contact with the separator of the electrode assembly and the spacer in the separation space between the electrode assembly and the spacer, and may extend further outward beyond the spacer. Such a form contributes to compactness of the secondary battery and/or contributes to prevention of interference between the current collecting tab and other battery constituent members.

In an embodiment, the current collecting tab extends from a face, of the spacer, toward the electrode assembly to a face, of the spacer, toward the exterior case so as to straddle opposing faces of the main face of the spacer. In the exemplary embodiment shown in FIG. 4, the current collecting tab 6 extends from the face toward the electrode assembly 200 to the face toward the exterior case 300 so as to straddle the main face of the spacer 4. For example, the current collecting tab may extend so as to be in contact with the opposing sides of the main face of the spacer 4. Here, "extending so as to straddle the opposing faces of the main face of the spacer" means that the tab extends on the opposing sides of the main face of the spacer 4 so as to reach at least ¼ or more of the sectional view dimension of the spacer 4 in sectional view of the secondary battery 400. With such a configuration, the current collecting tab and the spacer can be more suitably interfered with each other. Therefore, it is easy to prevent the spacer 4 from moving, and it is easy to reduce the impact that may occur between the electrode assembly 200 and the spacer 4.

In an embodiment, the electrode assembly 200 is a wound electrode assembly in which a positive electrode, a negative electrode, and a separator are wound (see FIG. 1B). Since the electrode assembly 200 has a wound configuration, it can have a structure in which the separator extension portion 30 converges toward the winding axis (see FIG. 4 and the like). Further, by laminating the separators 3 with a hollow portion (for example, an air layer) interposed therebetween, the separator extension portion 30 can easily have a cushioning property. This also makes it easy for the separator extension portion 30 to absorb an impact that may occur between the electrode assembly 200 and the spacer 4.

In an embodiment, at least part of the separator extension portion 30 has a bent shape convex toward the outer periphery of the winding (see FIG. 4 and the like). More specifically, at least part of the separator extension portion 30 has a portion $K_3$ having the bent shape convex toward the outer periphery of the winding. As a result, more hollow portions can be interposed between the separators 3, and the separator extension portion 30 can have a particularly cushioning property. Here, the "bent shape protruding toward the outer periphery" refers to a bent shape convex from the inner periphery toward the outer periphery in the winding direction in sectional view.

In an embodiment, the electrode assembly 200 has a convergence portion 30B where the separator extension portion 30 converges, and the portion $K_2$ having the bent shape of the current collecting tab 6 is in contact with the convergence portion 30B (see FIG. 6F). Here, the "convergence portion 30B" is a portion where the separator 3 converges toward the winding axis of the electrode assembly 200, and is positioned at the central portion of the end face 200' of the electrode assembly. Since the fulcrum is formed at the central portion of the electrode assembly by the portion having the bent shape being in contact with the convergence portion, the structural stability between the battery constituent members can be further enhanced.

In an embodiment, an insulating material 63 is provided at least on a portion having the bent shape of the current collecting tab 6. With such a configuration, the elasticity of the current collecting tab 6 is improved by the elasticity of the insulating material 63, and the impact can be further absorbed. In addition, insulation between the current collecting tab 6, the electrode assembly 200, and the exterior case 300 can be further enhanced. For example, in sectional view, a member of an insulating material 63 (in particular, a member of an insulating material 63 forming a layer with the tab) may be provided on an inner portion and/or an outer portion of the bent portion of the current collecting tab 6. Examples of the insulating material 63 include insulating polymer materials such as polyester (for example, polyethylene terephthalate), polyimide, polyamide, polyamideimide, and/or polyolefin (for example, polyethylene and/or polypropylene). From the viewpoint of providing a more intended bent shape, the insulating material 63 preferably comprises polypropylene.

In an embodiment, one face of the main face of the spacer is in contact with the electrode terminal structure of the exterior case. More specifically, in sectional view of the secondary battery 400, the electrode terminal structure 5' is provided on the exterior case 300, and the spacer 4 is in contact with the rivet portion 50 of the electrode terminal structure 5' (or attached to a rivet portion 50) (see FIG. 7). With such a configuration, it is possible to provide a space in which the current collecting tab can extend between the spacer 4 and the exterior case 300 while preventing the positional deviation between the spacer 4 and the exterior case 300.

Figure 7:
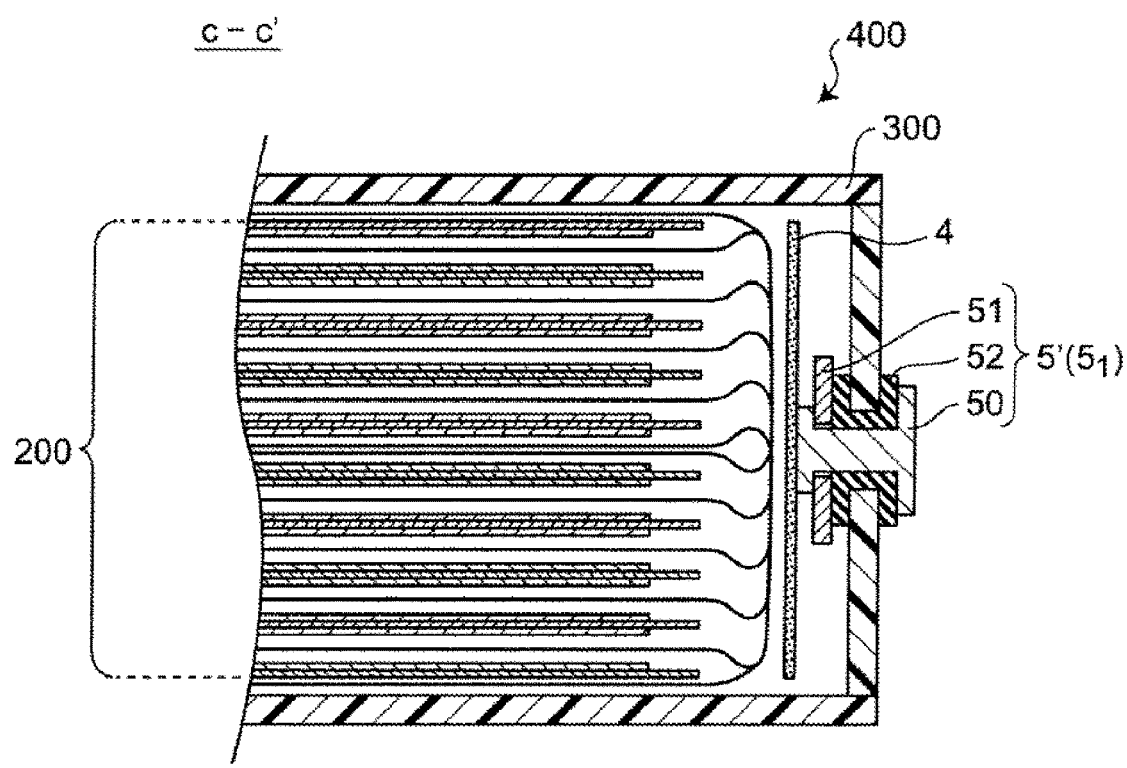
FIG. 7 is a schematic sectional view of the secondary battery taken along line c-c' in FIG. 3.

In a more preferred embodiment, the spacer 4 may include an adhesive layer, and the adhesive layer and the exterior case 300 may be in contact with each other (see FIG. 7). When the spacer 4 is in contact with the exterior case 300 with the adhesive layer interposed therebetween, the positional deviation between the spacer 4 and the exterior case 300 can be particularly prevented.

In an embodiment, the exterior case further includes an electrode terminal structure of any one of the positive electrode terminal and the negative electrode terminal, and part of each of the current collecting tabs is positioned between the spacer and the electrode terminal structure. In the illustrated exemplary embodiment, the adhesive layer provided on the main face of the spacer 4 toward the exterior case 300 is in contact with the rivet portion 50 of the electrode terminal structure 5' (see FIG. 7). One end, of the positive electrode current collecting tab 61, extending toward the exterior case 300 is attached to the inner terminal 51 of the electrode terminal structure 5' (that is, the positive electrode terminal $5_1$) (see FIGS. 4 and 7). Similarly, one end, of the negative electrode current collecting tab 62, extending toward the exterior case 300 is attached to a position, of the inside of the exterior case 300, corresponding to the negative electrode terminal $5_2$ (see FIG. 5). With such a configuration, the spacer and the current collecting tab are each fixed to the exterior case, and the positional deviation between the spacer and the current collecting tab can be further prevented.

In an embodiment, the length dimension of the current collecting tab is 1 mm or more and 30 mm or less. The "length dimension" herein refers to a length when the current collecting tab is straightly extended. When the length dimension is 1 mm or more, the bent shape (specifically, a plurality of bent shapes) can be more easily formed. Accordingly, the current collecting tab can have more excellent elasticity. When the length dimension is 30 mm or less, the secondary battery can be made more compact. In addition, the handling property of the current collecting tab can be further improved. The length dimension of the current collecting tab is preferably 2 mm or more and 20 mm or less, and is, for example, 5 mm or more and 10 mm or less.

In an embodiment, the width dimension of the current collecting tab is 100 μm or more and 10 mm or less. When the width dimension is 100 μm or more, the current collecting tab can have more excellent elasticity and rigidity. When the width dimension is 10 mm or less, the secondary battery can be made more compact. In addition, the handling property of the current collecting tab can be further improved. The width dimension of the current collecting tab is preferably 300 μm or more and 5 mm or less, for example, 500 μm or more and 2.5 mm or less.

In an embodiment, the thickness dimension of the current collecting tab is 10 μm or more and 3 mm or less.

When the thickness dimension is 10 μm or more, the current collecting tab can have more excellent elasticity and rigidity. When the thickness dimension is 3 mm or less, the secondary battery can be made more compact. In addition, the handling property of the current collecting tab can be further improved. The thickness dimension of the current collecting tab is preferably 50 μm or more and 2 mm or less, and is, for example, 70 μm or more and 1 mm or less.

The parameters (that is, the length dimension, the width dimension, and the thickness dimension) related to the shape of the current collecting tab may refer to a dimension measured using a micrometer (model number MDH-25 MB manufactured by Mitsutoyo Corporation) or a height gauge, or a value calculated from the dimension.

In an embodiment, the Young's modulus of the current collecting tab is 50 GPa or more and 300 GPa or less. When the Young's modulus is within such a range, the current collecting tab can have more excellent elasticity and rigidity while maintaining the good handling property. The Young's modulus of the current collecting tab is preferably 60 GPa or more and 250 GPa or less, and is, for example, 70 GPa or more and 200 GPa or less.

The Young's modulus of the current collecting tab described above may refer to a value measured by a method conforming to JIS standard (JIS R 1602). A tabletop precision universal tester (model number AGS-5kNX manufactured by Shimadzu Corporation) may be used for measuring the Young's modulus.

In an embodiment, the tensile strength of the current collecting tab is 50 N/mm$^2$ or more and 1000 N/mm$^2$ or less. When the tensile strength is within such a range, it is possible to obtain a current collecting tab that is more hardly broken while maintaining the good handling property of the current collecting tab. The tensile strength of the current collecting tab is preferably 80 N/mm$^2$ or more and 800 N/mm$^2$ or less, and for example, 100 N/mm$^2$ or more and 600 N/mm$^2$ or less.

The tensile strength of the current collecting tab may refer to a value measured by a method conforming to JIS standard (JIS Z 2241).

In an embodiment, the current collecting tab contains at least one selected from the group consisting of stainless steel, aluminum, nickel, and copper. With such a configuration, it is possible to obtain the current collecting tab with more excellent conductivity and elasticity.

The secondary battery according to the present disclosure can be manufactured by a manufacturing method including the following steps. That is, a method of manufacturing a secondary battery according to the present disclosure includes a step (electrode assembling step) of laminating or winding a positive electrode, a negative electrode, and a separator disposed between the positive electrode and the negative electrode to obtain a precursor of an electrode assembly, and a step (housing step) of forming the current collecting tabs so as to form a bent shape between the electrode assembly and a spacer while housing the electrode assembly and the spacer in the exterior case, and injecting an electrolyte into the exterior case.

Figure 8:
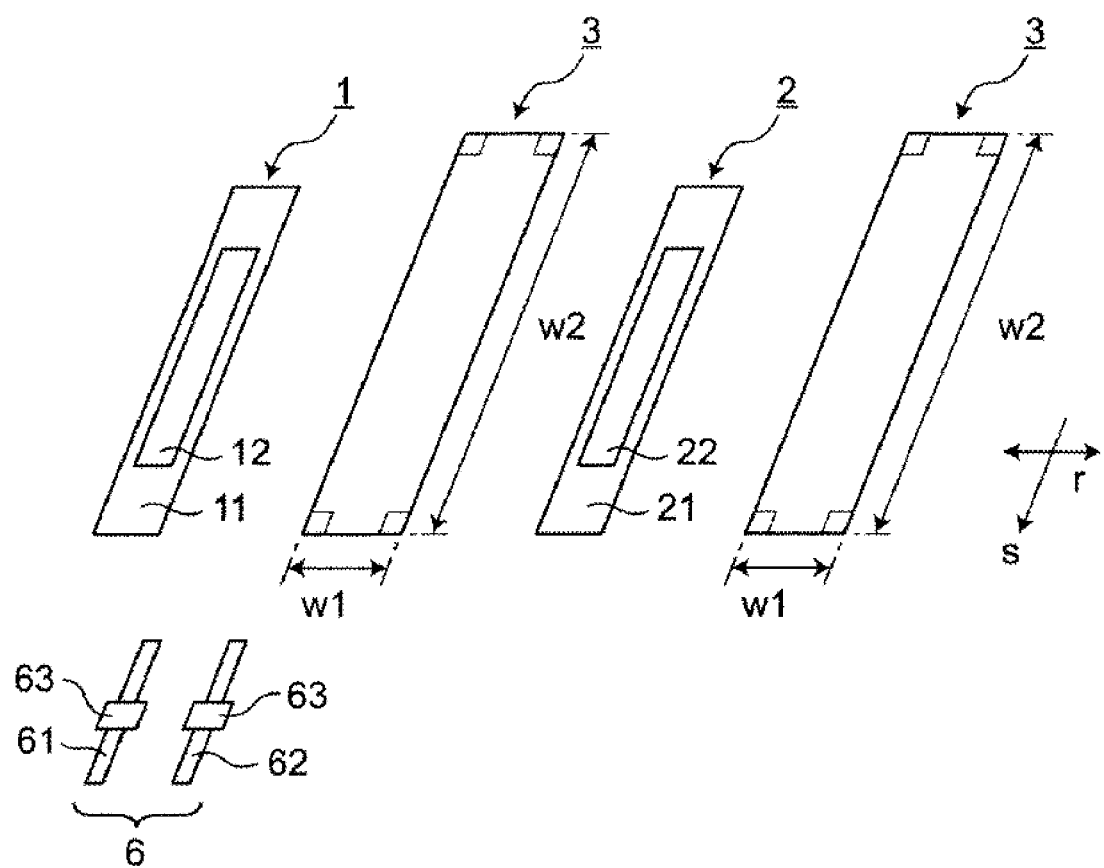
FIG. 8 is a schematic perspective view for explaining constituent members of an electrode assembly constituting the secondary battery according to an embodiment of the present disclosure.
Figure 9A:
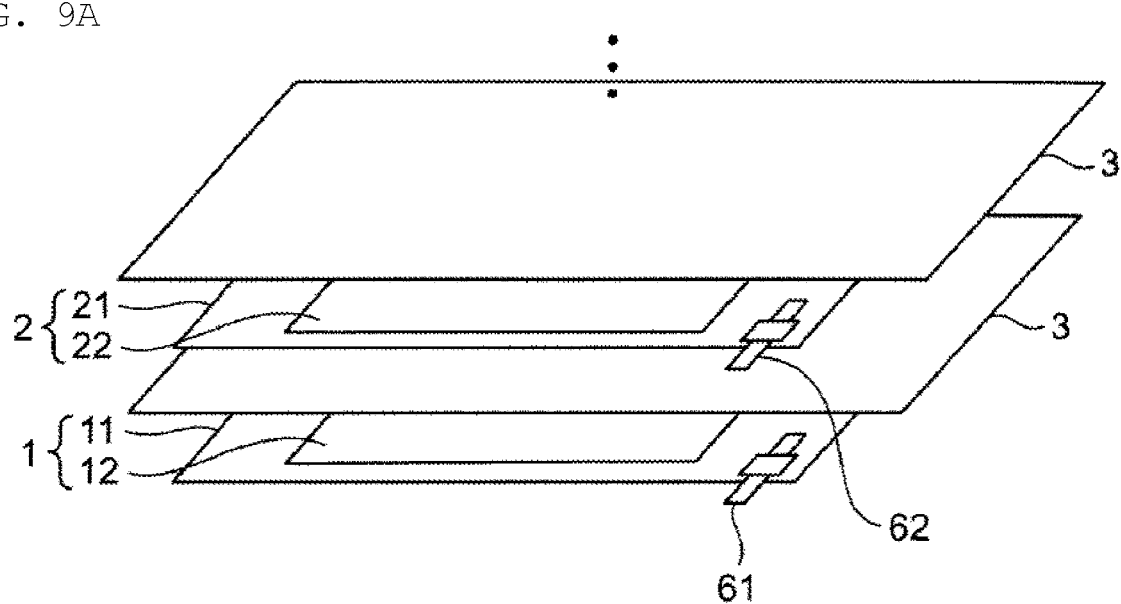
FIGS. 9A and 9B are schematic perspective views for explaining a method of assembling electrodes constituting the secondary battery according to an embodiment of the present disclosure.
Figure 9B:
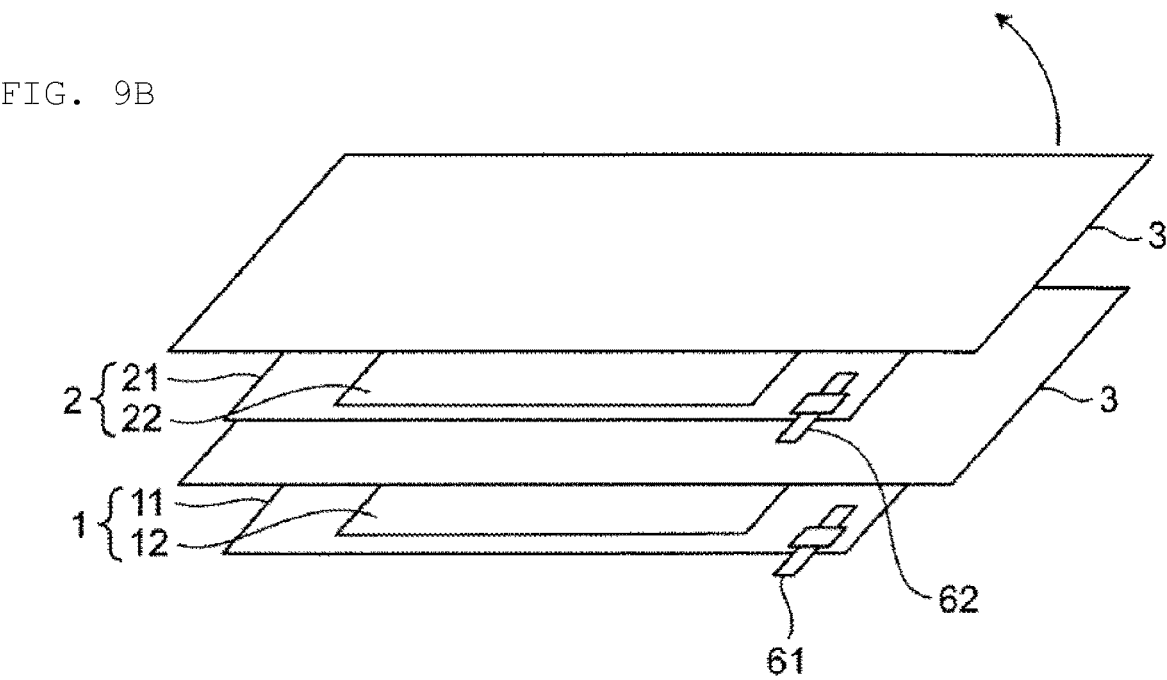
Figure 10:
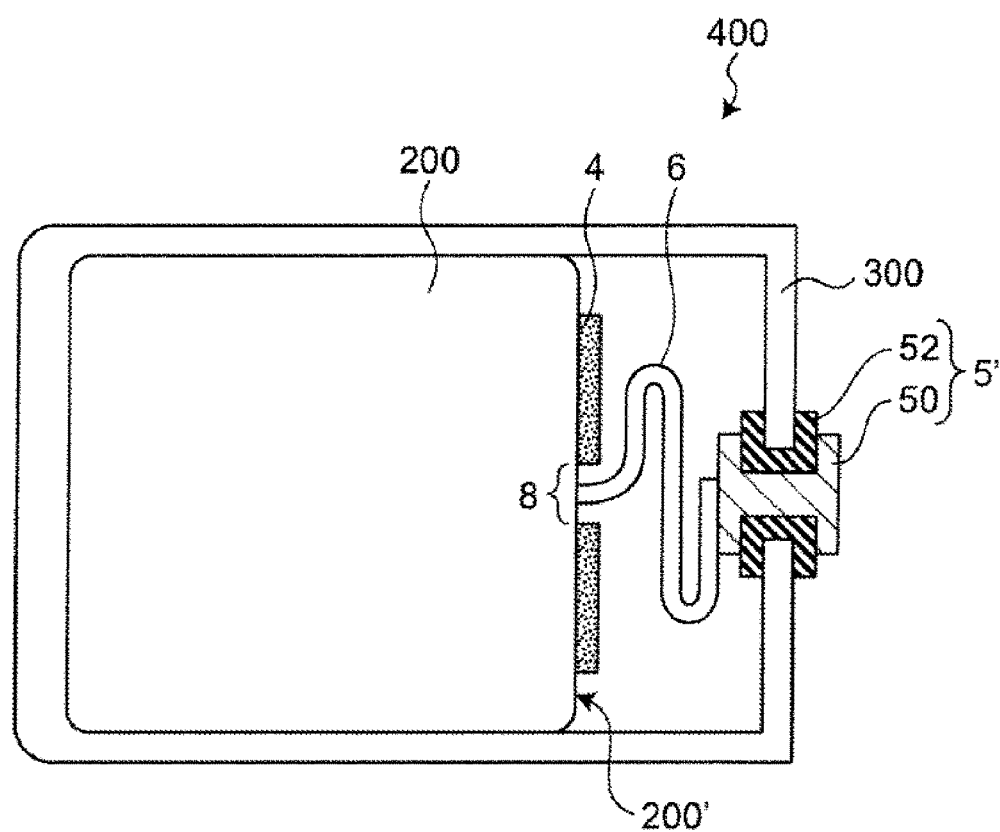
FIG. 10 is a schematic sectional view of a secondary battery according to a conventional technique.

In this step, as shown in FIG. 8, the positive electrode 1, the negative electrode 2, and the separator 3 having a rectangular shape are disposed in a predetermined order and laminated or wound to obtain a precursor of the electrode assembly. As shown in FIG. 9A, the precursor of the electrode assembly may be the planar lamination type electrode assembly 200 (see FIG. 1A) in which the positive electrode 1, the negative electrode 2, and the separator 3 are laminated in the thickness direction. Alternatively, as shown in FIG. 9B, the precursor of the electrode assembly may be a wound electrode assembly 200 (see FIG. 1B) by winding the positive electrode 1, the negative electrode 2, and the separator 3. Hereinafter, an assembly step of the wound electrode assembly will be described.

First, the positive electrode 1 having the material layer 12 and the positive electrode current collecting tab 61 attached to one side of the positive electrode current collector 11, the negative electrode 2 having the material layer 22 and the negative electrode current collecting tab 62 attached to one side of the negative electrode current collector 21, and two rectangular separators 3 are disposed in a predetermined order and wound (see FIG. 9B). When a predetermined tension is applied to the separator 3 at the time of winding, a precursor of the electrode assembly in which the separator 3 converges toward the winding axis P (or approaches each other) toward the distal end of the separator extension portion is obtained. The tension applied to the separator 3 during winding is usually 0.1 N or more and 10 N or less, and preferably 0.5 N or more and 3.0 N or less from the viewpoint of focusing.

The dimensions of the separator 3 to be used are not particularly limited as long as a desired electrode assembly is obtained. For example, the length dimension w1 of the separator 3 in the width direction r is usually preferably 105% or more and 400% or less, and for example, 120% or more and 200% or less the length of the positive electrode 1 or the negative electrode in the winding axis direction (see FIG. 8). For example, the length dimension w2 of the separator 3 in the longitudinal direction s may be appropriately determined according to the dimension of the intended secondary battery (particularly, the number of windings for the electrode assembly).

After this step, the precursor of the wound electrode assembly may be formed into a substantially flat column shape by pressing the precursor in the diameter direction of the wound body as desired.

Figure 2:
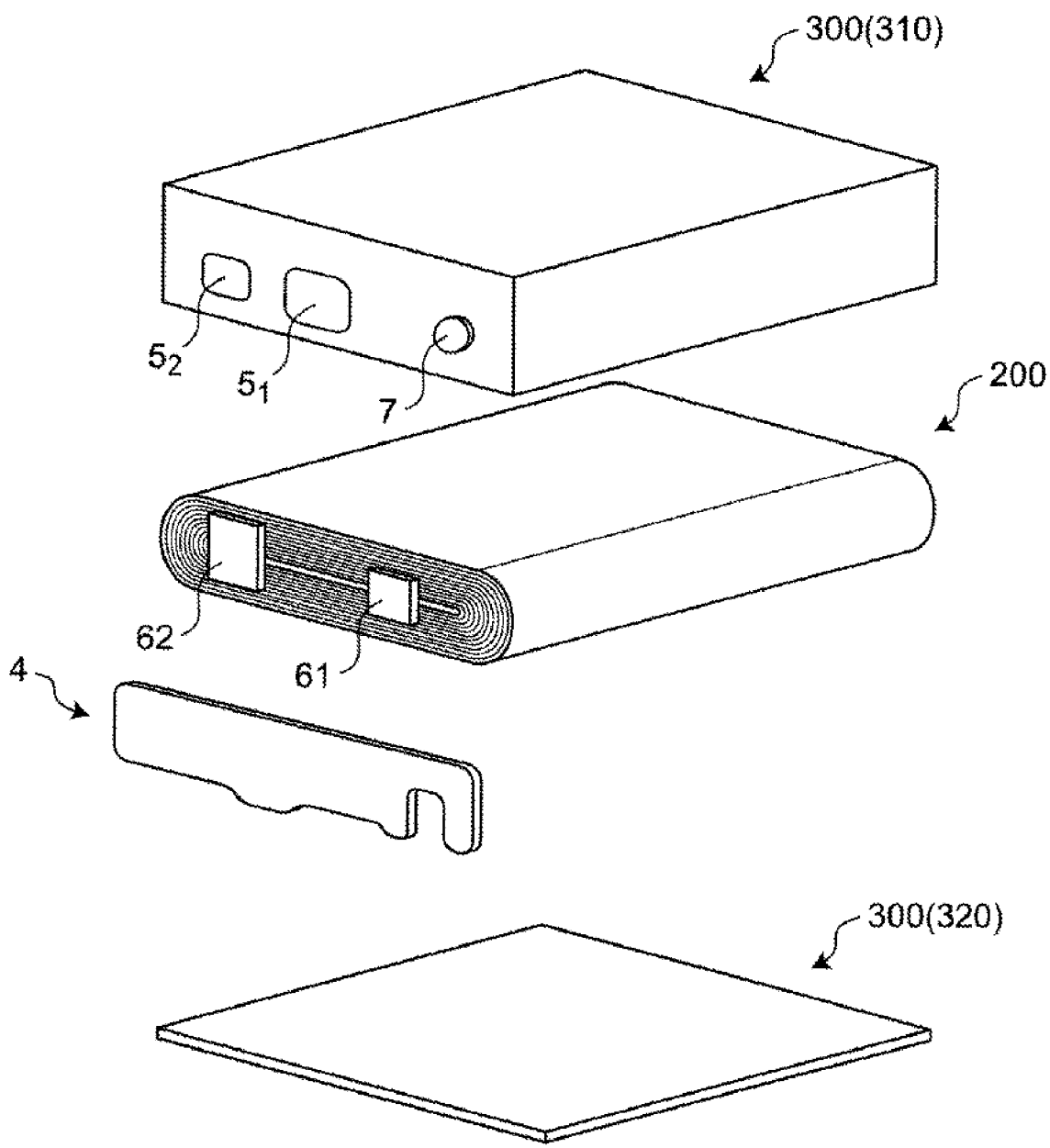
FIG. 2 is a schematic perspective developed view of a secondary battery according to an embodiment of the present disclosure.
Figure 3:
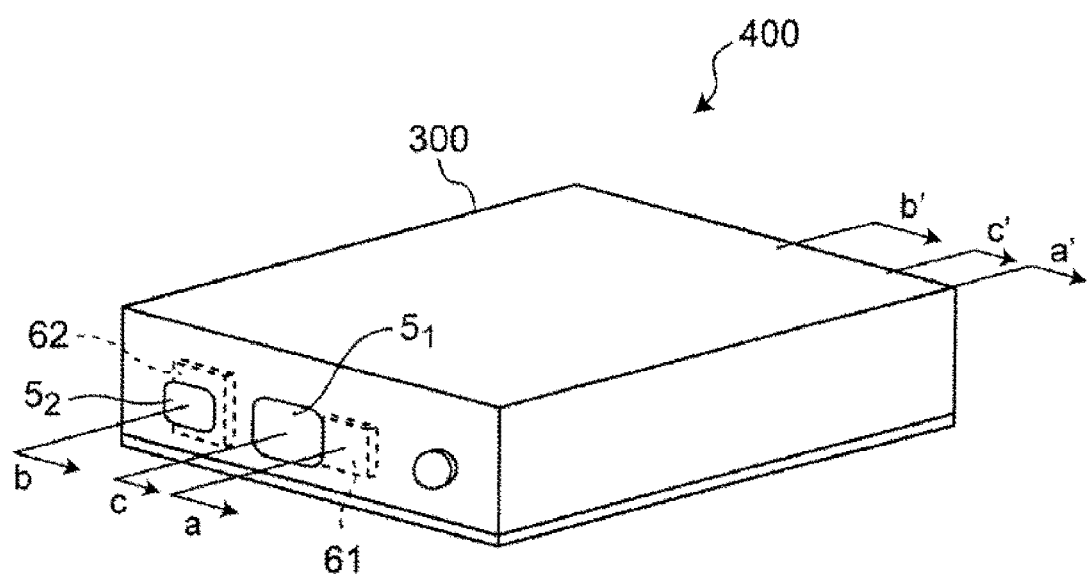
FIG. 3 is a schematic perspective view of the secondary battery according to an embodiment of the present disclosure.

While the electrode assembly 200 and the spacer 4 obtained in the previous step are housed in the exterior case 300, the current collecting tabs 61 and 62 are welded to the electrode terminal 5, and the electrolyte is injected into the exterior case 300 through the injection port 7 (see FIG. 2). Hereinafter, a case where the exterior case 300 includes an exterior case main body 310 and an exterior case lid 320, and an electrode terminal 5 and an electrode terminal structure 5' are provided on one face of the exterior case 300 will be described in detail.

Figure 5:
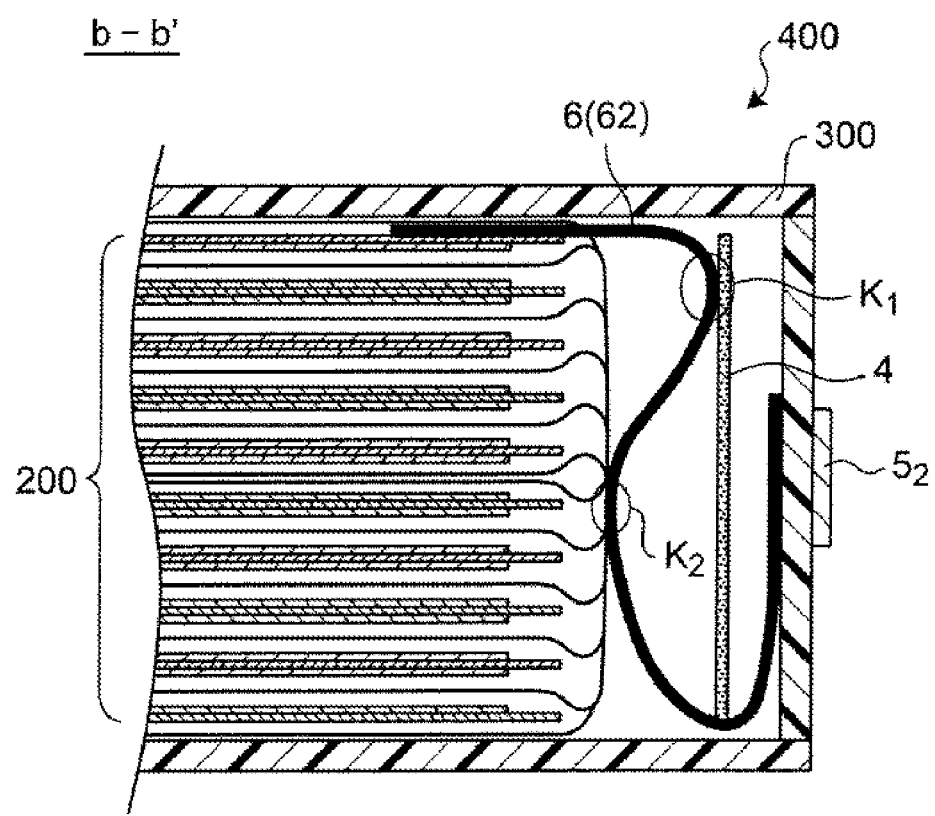
FIG. 5 is a schematic sectional view of the secondary battery taken along line b-b' in FIG. 3.

First, as illustrated in FIGS. 4 and 5, the current collecting tab 6 (that is, the positive electrode current collecting tab 61 and the negative electrode current collecting tab 62) is temporarily bent in advance and adjusted so that the current collecting tab 6 has a portion $K_1$ having a bent shape bent from the spacer 4 toward the electrode assembly 200 and a portion $K_2$ having a bent shape bent from the electrode assembly 200 toward the spacer 4, and then the current collecting tab 6 straddles the spacer 4.

Next, the electrode assembly 200 and the spacer 4 are housed in the exterior case main body 310 (see FIG. 2). At this time, an adhesive layer (not shown) provided on the main face of the spacer 4 toward the exterior case 300 is attached to the rivet portion 50 of the electrode terminal structure 5' (see FIG. 7). One end, of the positive electrode current collecting tab 61, extending toward the exterior case 300 is welded to the inner terminal 51 of the electrode terminal structure 5' (that is, the positive electrode terminal $5_1$) (see FIG. 4). Similarly, one end, of the negative electrode current collecting tab 62, extending toward the exterior case 300 is welded to a position, of the inside of the exterior case 300, corresponding to the negative electrode terminal $5_2$ (see FIG. 5).

Next, the exterior case main body 310 and the exterior case lid 320 are welded to each other (see FIG. 2). Finally, an electrolyte may be injected from the injection port 7, and the injection port 7 may be closed with a sealing plug (not shown). The welding may be achieved by any method known in the field of secondary batteries, and for example, a laser irradiation method may be used.

Although the embodiments of the present disclosure have been described above, only typical examples have been illustrated. A person skilled in the art can easily understand that the present disclosure is not limited thereto, and various embodiments are conceivable without changing the gist of the present disclosure.

The secondary battery according to the present disclosure can be used in various fields in which electricity storage is expected. By way of example only, the secondary battery can be used in the fields of electricity, information, and communication in which an electric/electronic device, and the like are used (for example, electric/electronic device fields or mobile device fields including mobile phones, smartphones, notebook computers and digital cameras, activity meters, arm computers, electronic paper, RFID tags, card-type electronic money, small electronic machines such as smartwatches, and the like), home and small industrial applications (for example, fields of electric power tools, golf carts, and home, nursing, and industrial robots), large industrial applications (for example, fields of forklifts, elevators, and harbor cranes), transportation system fields (For example, fields of hybrid vehicles, electric vehicles, buses, trains, power-assisted bicycles, electric two-wheeled vehicles, and the like), power grid applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields of space probes and submersibles), and the like.

The secondary battery according to the present disclosure can prevent a short circuit that may occur particularly when an impact or heat is applied to the battery. Therefore, the secondary battery according to the present disclosure can be particularly preferably used for a mobile device application in which shock or heat can be applied from all directions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising an electrode assembly including a positive electrode, a negative electrode, and a separator disposed between the positive electrode and the negative electrode, and an electrolyte enclosed in an exterior case, wherein
the secondary battery includes a spacer positioned between the electrode assembly and the exterior case, wherein
the electrode assembly includes current collecting tabs of the positive electrode and the negative electrode each protruding from a same end face of the electrode assembly, wherein
the spacer is positioned between an end face of the electrode assembly, from which the current collecting tabs each protrude, and the exterior case, wherein
at least one of the current collecting tabs of the positive electrode or the negative electrode has a bent shape between the electrode assembly and the spacer, wherein
the electrode assembly has a separator extension portion in which the separator extends outward of the positive electrode and the negative electrode at the end face from which the current collecting tabs each protrude, and a portion having the bent shape of each of the current collecting tabs is in contact with the separator extension portion, wherein
the electrode assembly includes a wound electrode assembly, and the positive electrode, the negative electrode, and the separator are wound, wherein
at least part of the separator extension portion has a bent shape convex toward an outer periphery of the wound electrode assembly, and wherein
the electrode assembly has a convergence portion at which the separator extension portion converges, and a portion having the bent shape of the at least one current collecting tab is in contact with the convergence portion.

2. The secondary battery according to claim 1, wherein the bent shape between the electrode assembly and the spacer includes a bowed shape bent in an arch shape.

3. The secondary battery according to claim 1, wherein the current collecting tabs extend to meander in sectional view in a separation space between the electrode assembly and the spacer.

4. The secondary battery according to claim 1, wherein the portion having the bent shape of the at least one current collecting tab is in contact with the spacer.

5. The secondary battery according to claim 1, wherein the current collecting tabs extend from a face, of the spacer, toward the electrode assembly to a face of the spacer toward the exterior case to straddle opposing faces of the spacer.

6. The secondary battery according to claim 5, wherein the at least one current collecting tab extends to be in contact with the opposing faces of the spacer.

7. The secondary battery according to claim 1, wherein between the electrode assembly and the spacer, at least one of the current collecting tabs is in contact with both the spacer and the separator.

8. The secondary battery according to claim 7, wherein at least two bent portions of the at least one current collecting tab are provided, and wherein one of the bent portions of the at least one current collecting tab is in contact with the spacer, and wherein the other of the bent portions of the at least one current collecting tab is in contact with the separator.

9. The secondary battery according to claim 1, wherein an insulating material is provided at least at a portion having the bent shape in each of the current collecting tabs.

10. The secondary battery according to claim 1, wherein at least one current collecting tab extends in a meandering manner while being in contact with the separator of the electrode assembly and the spacer in a separation space between the electrode assembly and the spacer, and extends further outward beyond the spacer.

11. The secondary battery according to claim 10, wherein the exterior case further includes an electrode terminal structure of one of a positive electrode terminal and a negative electrode terminal, and part of each of the current collecting tabs is positioned between the spacer and the electrode terminal structure.

12. The secondary battery according to claim 11, wherein the exterior case is a conductive case type exterior case, and assumes a charge whose polarity is opposite to a polarity of the electrode terminal structure.

13. The secondary battery according to claim 1, wherein the positive electrode and the negative electrode are capable of absorbing and releasing lithium ions.

14. The secondary battery according to claim 1, wherein the secondary battery is included in a mobile device.

15. The secondary battery according to claim 1, wherein the portion having the bent shape of at least one of the current collecting tabs bends in a different shape than the at least part of the separator extension portion having a bent shape.

16. The secondary battery according to claim 1, wherein at least one of the current collecting tabs includes an area approaching the separator and an area away from the separator.

17. The secondary battery according to claim 1, wherein at least one of the current collecting tabs includes an area configured to project toward the separator.

* * * * *